(12) United States Patent
Mutilangi et al.

(10) Patent No.: US 9,060,537 B2
(45) Date of Patent: Jun. 23, 2015

(54) METHOD FOR ENHANCING REBAUDIOSIDE D SOLUBILITY IN WATER

(75) Inventors: William Mutilangi, Peekskill, NY (US); Naijie Zhang, Ridgefield, CT (US)

(73) Assignee: PEPSICO, INC., Purchase, NY (US)

( * ) Notice: Subject to any disclaimer, the term of this patent is extended or adjusted under 35 U.S.C. 154(b) by 350 days.

(21) Appl. No.: 13/429,473

(22) Filed: Mar. 26, 2012

(65) Prior Publication Data

US 2013/0251881 A1   Sep. 26, 2013

(51) Int. Cl.
*A23L 1/236* (2006.01)
*A23L 2/60* (2006.01)

(52) U.S. Cl.
CPC ............... *A23L 1/2366* (2013.01); *A23L 1/236* (2013.01); *A23L 1/2362* (2013.01); *A23L 1/2363* (2013.01); *A23L 2/60* (2013.01)

(58) Field of Classification Search
CPC ..... A23L 1/236; A23L 1/2362; A23L 1/2363; A23L 1/2366; A23L 2/60; A23C 1/04
USPC .......................... 426/548, 590, 658, 471, 520
See application file for complete search history.

(56) References Cited

U.S. PATENT DOCUMENTS

| | | |
|---|---|---|
| 2007/0292582 A1 | 12/2007 | Prakash et al. |
| 2008/0226773 A1 | 9/2008 | Lee |
| 2011/0059218 A1 | 3/2011 | Corliss et al. |
| 2011/0092684 A1 | 4/2011 | Abelyan et al. |
| 2011/0189360 A1 | 8/2011 | Yoo et al. |
| 2011/0195161 A1 | 8/2011 | Upreti et al. |

FOREIGN PATENT DOCUMENTS

| | | |
|---|---|---|
| WO | 2008127063 | 10/2008 |
| WO | 2010118218 | 10/2010 |
| WO | 2011047227 | 4/2011 |
| WO | 2011056834 | 5/2011 |
| WO | 2011059954 | 5/2011 |
| WO | 2011105561 | 9/2011 |

OTHER PUBLICATIONS

Mani Upreti, et al., Solubility Enhancement of Steviol Glycosides and Characterization of Their Inclusion Complexes with Gamma-Cyclodextrin, International Journal of Molecular Sciences, vol. 12, pp. 7529-7553, dated 2011.
PCT Patent Application PCT/US13/30707, International Search Report and Written Opinion, mailed May 31, 2013.

*Primary Examiner* — Leslie Wong
(74) *Attorney, Agent, or Firm* — Banner & Witcoff, Ltd.

(57) ABSTRACT

A clear Reb D solution is prepared by adding Reb D powder to water and heating to completely dissolve the Reb D powder, or by extracting Reb D from stevia plant using hot/boiling water or water/ethanol, wherein the temperature of the clear Reb D solution is above 70° C. Ideally, the clear Reb D solution is mixed with a solubilizing enhancer, wherein the temperature of the enhanced Reb D solution is maintained above 70° C., and wherein the solubilizing enhancer is a hydroxyl-containing sweetener. A stabilizer is then added to the Reb D solution to produce a stabilized Reb D solution; wherein the stabilizer comprises a thickener or anti-agglomeration agent. The stabilized Reb D solution is spray dried to form a powder. The solubility of Rebaudioside D is enhanced in water-based fluids, in particular in beverage concentrates and syrups 1.

19 Claims, No Drawings

METHOD FOR ENHANCING REBAUDIOSIDE D SOLUBILITY IN WATER

FIELD OF INVENTION

The present invention is directed at enhancing the solubility of Rebaudioside D in water.

BACKGROUND

Sweet steviol glycoside compounds are present in small concentrations and can be extracted from plant materials, particularly the leaves of the Stevia rebaudiana Bertoni plant. A crude stevia extract typically comprises stevioside, steviolbioside, several rebaudiosides, including rebaudioside A, rebaudioside B, rebaudioside C, rebaudioside D, and rebaudioside E, and dulcoside compounds. For convenience, the rebaudiosides may be referred to here as Reb A, Reb B, Reb C, etc.

Of the Rebaudiosides, Reb A is commonly used as sweetener in beverage applications, but has off-taste issues. Reb D has a better sugar character and more desirable taste than Reb A, but Reb D is difficult to use in food products because of its low solubility in water at room temperature. For instance, Reb D needs to be heated to near boiling water temperature for 2 hours in order to achieve complete dissolution at 0.8% concentration. At most only 300 to 450 ppm can be solubilized in water at 23° C.

Due to this low solubility, if when Reb D was is used in beverages, for example, it was needs to be combined with other sweeteners having good solubility that are more soluble in water. There is business interest now into developing sweetener compositions higher in Reb D content, e.g., sweetener compositions having a sweetening amount of Reb D (i.e., an amount of Reb D that perceptibly contributes to the total sweetness provided by the sweetener), for example, sweeteners in which Reb D is the primary sweetener. Such development is impeded, in part by the lack of low solubility in water of the Reb D, thus making it difficult to use in beverages, for example. It would be advantageous, therefore, to develop improved methods to enhance solubility of Reb D in water at room temperature (20-25° C.).

Traditional processes for making beverages manufacturing process involves an intermediate concentrated syrup step require a 6 folds concentration of ingredients in a concentrate or syrup. This syrup is then diluted by 5 folds of with water. This works fine if all syrup ingredients are soluble in water to the extent of 6 folds of the level in the finished beverage. Reb D is not very soluble (about 300-450 ppm) and cannot be provided in a syrup or concentrate in amounts sufficient enough to provide a sweetened beverage.

Accordingly, it is an object of some aspects of the present invention to provide improved methods to enhance the solubility of Reb D in water. Additional objects and advantages of all or certain embodiments of the systems and methods disclosed here will be apparent to those skilled in the art given the benefit of the following disclosure and discussion of certain exemplary embodiments.

SUMMARY

The present invention relates to enhancing the solubility of Reb D in water-based fluids such as beverages and beverage concentrates.

In one aspect, the present invention is directed to a method of enhancing the solubility of Rebaudioside D ("Reb D") in aqueous-based liquids comprising: preparing a clear Reb D solution by adding Reb D powder to water and heating to completely dissolve the Reb D powder or by extracting Reb D from stevia plant using hot/boiling water, wherein the temperature of the clear Reb D solution is above 70° C.; mixing the clear Reb D solution with a solubility enhancer, wherein the temperature of the enhanced Reb D solution is maintained above 70° C., and wherein the solubility enhancer is a water soluble organic acid or salt thereof or a hydroxyl-containing sweetener; adding a stabilizer to the enhanced Reb D solution; wherein the stabilizer comprises a thickener or anti-agglomeration agent; and spray drying the stabilized Reb D solution to form a powder.

In another aspect, the present invention is directed to a method of enhancing the solubility of Rebaudioside D ("Reb D") in aqueous-based liquids comprising: preparing a clear Reb D solution by adding Reb D powder to water and heating to completely dissolve the Reb D powder or by extracting Reb D from stevia plant using hot/boiling water, wherein the temperature of the clear Reb D solution is above 70° C.; adding a stabilizer to the Reb D solution to produce a stabilized Reb D solution; wherein the stabilizer comprises a thickener or anti-agglomeration agent; and spray drying the stabilized Reb D solution to form a powder.

DETAILED DESCRIPTION

Various examples and embodiments of the inventive subject matter disclosed here are possible and will be apparent to the person of ordinary skill in the art, given the benefit of this disclosure. In this disclosure reference to "some embodiments," "certain embodiments," "certain exemplary embodiments" and similar phrases each means that those embodiments are merely non-limiting examples of the inventive subject matter, and there are alternative embodiments which are not excluded. Unless otherwise indicated or unless otherwise clear from the context in which it is described, alternative and optional elements or features in any of the disclosed embodiments and examples are interchangeable with each other. That is, an element described in one embodiment or example should be understood to be interchangeable or substitutable for one or more corresponding but different elements in another described example or embodiment and, likewise, an optional feature of one embodiment or example may optionally also be used in other embodiments and examples. More generally, the elements and features of any disclosed example or embodiment should be understood to be disclosed generally for use with other aspects and other examples and embodiments. A reference to a component or ingredient being operative or configured to perform one or more specified functions, tasks and/or operations or the like, is intended to mean that it can perform such function(s), task(s) and/or operation(s) in at least certain embodiments, and may well be able to perform also one or more other functions, tasks and/or operations.

Large quantities of beverages are typically not prepared in large batches. Instead, syrup, water, and optionally carbon dioxide are combined at the time of use or at the time of bottling of the beverage. Traditionally one part syrup is combined with five parts water. The syrup is a concentrate and the ingredients must be soluble in this concentrate. For example, a typical sweetener in diet beverages is aspartame. The aspartame must be soluble in the syrup up to 3000 ppm in order to provide the desired sweetness value of 500 ppm when diluted with water to a final beverage. Other sweeteners including Reb A may be used in the syrup. However, Reb D typically is not used, or is only used as a minor component of the sweetener, because of its poor solubility in the syrup.

The present invention is directed to a method of enhancing the solubility of Reb D in water so that the Reb D is suitable for use in concentrates or syrups. Depending on the process used, the solubility can be increased up to 1500 ppm, or 3000 ppm, or 7000 ppm, and even up to 8000 ppm at 23° C.

First, Reb D powder is added to water and heated to completely dissolve the Reb D powder. The concentration of the Reb D in the water is less than 3 wt %, typically 0.1 to 2.5 wt %, or 0.5 to 2.0 wt %, or 1.0 wt %.

The Reb D may be added to pre-heated water, i.e. at a temperature of above 70° C., or the mixture of Reb D in water may be heated to a temperature of above 70° C., to solubilize the Reb D in the water. Typically the temperature will be 80 to 100° C. In either event, the heated water will solubilize the Reb D to a maximum solubility of 2.5 wt %. The resulting Reb D solution should be clear indicating that all of the Reb D has dissolved.

Alternatively, Reb D may be extracted from a stevia plant using hot/boiling water. The temperature of the water is hot enough to extract the Reb D and at least 70° C. The Reb D solution is purified with techniques known in the art. The temperature of the clear Reb D solution should remain above 70° C.

At this point, the Reb D clear solution can be spray dried resulting in fine powder. The solubility of the Reb D increases to 1500 ppm compared to solubility of 300 ppm for untreated Reb D.

Second, the solubility is further enhanced by mixing the clear Reb D solution with a solubilizing enhancer comprising a water soluble organic acid or salt or a hydroxyl-containing sweetener. The concentration of solubilizing enhancer in the solution of solubilized Reb D is 0.05%-70% w/w.

The temperature of the enhanced Reb D solution is maintained at 70° C. or above, typically 70 to 80° C., to maintain a clear solution prior to spray drying. The enhanced solution contains a ratio of solubilizing enhancer to Reb D from 0.01:1 to 100:1, or 0.1:1 to 50:1, or 1:1 to 20:1, for example 10:1 The pH of the solution 3 to 7.

Suitable organic acids and their salts are water soluble and include sorbic acid, ascorbic acid, benzoic acid, citric acid, tartaric acid, propionic acid, butyric acid, acetic acid, succinic acid, glutaric acid, maleic acid, malic acid, valeric acid, caproic acid, malonic acid, aconitic acid, potassium sorbate, sodium benzoate, sodium citrate, amino acids, and combinations of any of them. A benefit of organic acids and salts thereof is that they are non-nutritive and thus do not add calories to the Reb D powder.

Suitable hydroxyl-containing sweeteners are water soluble and include erythritol, maltodextrin, sucrose, glycerol, propylene glycol, glucose, fructose, maltose, dextrose, xylose, sorbitol, xyitol, mannitol, maltitol, lactiol, arabitol, isomalt or combinations of any of them.

In some aspects, the organic acids/salts and the sweeteners are ascorbic acid, potassium sorbate, sodium benzoate, erythritol, maltodextrin, sucrose, or combinations of any of them.

It has been reported that the enhancement of solubility and bioavailability can be achieved through the co-crystallization of a compound that is water insoluble with a solubilizing enhancer. For example, the solubility and bioavailability of quercetin can be increased 14-fold and 10-fold, respectively by co-crystallization of quercetin with caffeine in a mass ratio of 2:1 (Adam J. Smith et al. "Mol. Pharmaceutics", 2011, 8 (5), pp 1867-1876.) Therefore, it is believed that the water soluble organic acids/salts and hydroxyl-containing sweeteners decrease the crystalline structure and promote the hydration of Reb D. In addition, the organic acids/salts and hydroxyl-containing sweeteners may form co-crystals complex with Reb D through hydrogen bonding and/or guest-host complex resulting in increased solubility of the Reb D in water. Finally, organic acids/salts and hydroxyl-containing sweeteners will maintain or increase the sweetness intensity in the final beverage product. Not only can potassium sorbate or sodium benzoate enhance the solubility of Reb D, they also acts as preservative in finished beverage.

Third, the Reb D solution is stabilized by the addition of a stabilizer in the form of a thickener or anti-agglomeration additive such as a polysaccharide. The stabilizer can increase spray drying efficiency, Reb D recovery, as well preventing Reb D from crystallization when it dissolves in water. Suitable polysaccharides include gum arabic, pectin, carrageenan, ghatti gum, acacia gum, guar gum, xanthan gum, locust bean gum, gellen gum, agar, starch, alginate, cellulose, modified starch, carboxyl methyl cellulose (CMC) or the combination thereof. The ratio of stabilizer to Reb D is from 0.01:1 to 5:1. The stabilizer can be added as a solid or a solution.

Fourth, the Reb D clear solution containing solubilizing enhancer and stabilizer is spray dried to form a spray dried Reb D powder. Spray drying provides fine powders with large surface area.

The spray dried Reb D powder has a solubility of up to 8000 ppm at 23° C. This Reb D powder may be added to beverage concentrates at amounts of at least 1200 ppm and up to 5000 ppm, typically 1800 to 3000 ppm, at room temperature (20-25° C.).

The resulting Reb D powder containing the organic acids or salts thereof or the hydroxyl-containing sweetener dissolves in water rapidly with minimal mixing energy. Beverages made with modified Reb D powder have a comparable taste profile to beverages made with untreated Reb D. That is, the treated Reb D powder maintains the sweetness characteristics of the untreated Reb D. Further, not only do the sugar alcohols enhance the solubility of Reb D, but can also increase sweetness over all.

In accordance with another aspect of the present invention, the solubility of the Reb D can be increased upwards to 1500 ppm at 23° C. This aspect is similar to the aspect described above, but without the addition of solubilizing enhancer.

First, Reb D powder is added to water and heated to completely dissolve the Reb D powder. The concentration of the Reb D in the water is less than 2.5 wt. %, typically 0.1 to 2.5 wt %, or 0.5 to 2.0 wt %, or 1.0 wt %.

The Reb D may be added to pre-heated water, i.e. at a temperature of above 70° C., or the mixture of Reb D in water may be heated to a temperature of above 70° C., to solubilize the Reb D in the water. Typically the temperature will be 80 to 100° C. In either event, the heated water will solubilize the Reb D to a maximum solubility of 2.5 wt %. The resulting Reb D solution should be clear indicating that all of the Reb D has dissolved.

Alternatively, Reb D may be extracted from a stevia plant using hot/boiling water. The temperature of the water is hot enough to extract the Reb D and at least 70° C. The Reb D solution is purified with techniques known in the art. The temperature of the clear Reb D solution should remain above 70° C.

At this point, the Reb D clear solution can be spray dried resulting in fine powder. The solubility of the Reb D increases to 1500 ppm compared to that of 300 ppm of untreated Reb D.

Second, the Reb D solution is stabilized by the addition of a stabilizer in the form of a thickener or anti-agglomeration additive such as a polysaccharide. Suitable polysaccharides include gellan gum, gum Arabic, pectin, carrageenan, ghatti gum, acacia gum, guar gum, xanthan gum, locust bean gum, agar, starch, alginate, cellulose, modified starch, carboxyl methyl cellulose (CMC) or the combination thereof.

The temperature of the Reb D solution is maintained above 70° C., typically 70 to 80° C., to maintain a clear solution prior to spray drying.

Third, the stabilized Reb D solution containing a solubilizing enhancer is spray dried to form a spray dried Reb D powder. Spray drying provides fine powders which provide a large surface area. Fine particle sizes are generally 1 to 300 microns. The finer the particle size, the greater the total surface area, and the greater the dissolution rate when the powder is added to the concentrate.

The spray dried Reb D powder has a solubility of up to 3000 ppm at 23° C. This Reb D powder may be added to beverage concentrates at amounts of at least 1200 ppm and up to 3000 ppm, typically 1800 to 3000 ppm, at room temperature.

The resulting Reb D solution dissolves in water rapidly with minimal mixing energy. Beverages made with stabilized Reb D powder have a comparable taste profile to beverages made with untreated Reb D. That is, the stabilized Reb D powder maintains the sweetness characteristics of the untreated Reb D.

Beverages prepared with the Reb D powder in accordance with either aspect discussed above, are stable at pH 3 to 5 and are clear with no settling, precipitation, and color change observed over time.

Reb D is obtained from the stevia plant in any suitable manner. For example, the Reb D may be extracted with hot/boiling water or water/ethanol mixture. The Reb D is isolated and purified. As noted above, this solution can be spray dried resulting in increased solubility.

The spray drying may be by any suitable method with any suitable equipment. Buchi mini spray dryer is used to produce Reb D powder. The machine conditions are as follows: Evaporative capacity: 1.0 L/hr water; Air flow: max of 35 cu. m/hr; Maximum temperature input: 220 C; Spray gas and pressure: compressed air or nitrogen, 200-1000 l/hr, 5-8 bar; Nozzle diameter: 0.7 mm.

The Reb D powder prepared in accordance with embodiments herein may be used in beverage products including, ready to drink liquid formulations, beverage concentrates and the like. The Reb D is particularly useful for beverage concentrates or syrups where much higher amounts of sweetener are needed in solution.

Beverages include, e.g., carbonated and non-carbonated soft drinks, fountain beverages, frozen ready-to-drink beverages, coffee beverages, tea beverages, dairy beverages, powdered soft drinks, as well as liquid concentrates, flavored waters, enhanced waters, fruit juice and fruit juice-flavored drinks, sport drinks, and alcoholic products.

The terms "beverage concentrate" and "syrup" are used interchangeably throughout this disclosure. At least certain exemplary embodiments of the beverage concentrates contemplated are prepared with an initial volume of water to which the additional ingredients are added. Full strength beverage compositions may be formed from the beverage concentrate by adding further volumes of water to the concentrate. Typically, for example, full strength beverages may be prepared from the concentrates by combining approximately 1 part concentrate with between approximately 3 to approximately 7 parts water. In certain exemplary embodiments the full strength beverage is prepared by combining 1 part concentrate with 5 parts water. In certain exemplary embodiments the additional water used to form the full strength beverages is carbonated water. In certain other embodiments, a full strength beverage is directly prepared without the formation of a concentrate and subsequent dilution.

Water is a basic ingredient in the beverage products disclosed here, typically being the vehicle or primary liquid portion in which the remaining ingredients are dissolved, emulsified, suspended or dispersed. Purified water can be used in the manufacture of certain embodiments of the beverages disclosed here, and water of a standard beverage quality can be employed in order not to adversely affect beverage taste, odor, or appearance. The water typically will be clear, colorless, free from objectionable minerals, tastes and odors, free from organic matter, low in alkalinity and of acceptable microbiological quality based on industry and government standards applicable at the time of producing the beverage. In certain typical embodiments, water is present at a level of from about 80% to about 99.9% by weight of the beverage. In at least certain exemplary embodiments the water used in beverages and concentrates disclosed here is "treated water," which refers to water that has been treated to reduce the total dissolved solids of the water prior to optional supplementation, e.g., with calcium as disclosed in U.S. Pat. No. 7,052,725. Methods of producing treated water are known to those of ordinary skill in the art and include deionization, distillation, filtration and reverse osmosis ("r-o"), among others. The terms "treated water," "purified water,", "demineralized water," "distilled water," and "r-o water" are understood to be generally synonymous in this discussion, referring to water from which substantially all mineral content has been removed, typically containing no more than about 500 ppm total dissolved solids, e.g. 250 ppm total dissolved solids.

Example 1

To a 1000 ml beaker, 3 g Reb D and 600 g water were added. The Reb D mixture was heated to 80-100° C. until completely dissolved. The temperature was maintained above 70° C. to keep Reb D clear solution. Subsequently, the Reb D clear solution was subjected to spray drying resulting in powder containing 95% Reb D.

Example 2

To a 1000 ml beaker, 3 g Reb D and 580 g water were added. The Reb D mixture was heated to 80-100° C. until completely dissolved. Then, 6 g (25%) gum arabic solution were added. The temperature was maintained above 70° C. to keep Reb D clear solution. Subsequently, the Reb D clear solution was subjected to spray drying resulting in powder containing 66.67% Reb D.

Example 3

To a 1000 ml beaker, 3 g Reb D and 580 g water were added. The Reb D mixture was heated to 80-100° C. until completely dissolved. Then, 9 g sucrose and 6 g (25%) gum arabic were added. The temperature was maintained above 70° C. to keep Reb D clear solution. Subsequently, the Reb D clear solution was subjected to spray drying resulting in powder containing 22.2% Reb D.

Example 4

To a 1000 ml beaker, 3 g Reb D and 580 g water were added. The Reb D mixture was heated to 80-100° C. until completely dissolved. Then, 9 g maltodextrin, 3 g erythritol, and 6 g (25%) gum arabic were added. The temperature was maintained above 70° C. to keep Reb D clear solution. Subsequently, the Reb D clear solution was subjected to spray drying resulting in powder containing 18.18% Reb D.

Example 5

To a 1000 ml beaker, 3 g Reb D and 580 g water were added. The Reb D mixture was heated to 80-100° C. until completely dissolved. Then, 3 g maltodextrin, 3 g erythritol, and 6 g (25%) gum arabic were added. The temperature was maintained above 70° C. to keep Reb D clear solution. Subsequently, the Reb D clear solution was subjected to spray drying resulting in powder containing 28.57% Reb D.

Example 6

To a 1000 ml beaker, 3 g Reb D and 580 g water were added. The Reb D mixture was heated to 80-100° C. until completely dissolved. Then, 6 g maltodextrin, 3 g erythritol, and 12 g (25%) gum arabic were added. The temperature was maintained above 70° C. to keep Reb D clear solution. Subsequently, the Reb D clear solution was subjected to spray drying resulting in powder containing 20% Reb D.

Example 7

To a 1000 ml beaker, 3 g Reb D and 580 g water were added. The Reb D mixture was heated to 80-100° C. until completely dissolved. Then, 9 g maltodextrin and 6 g (25%) gum arabic solution were added. The temperature was maintained above 70° C. to keep Reb D clear solution. Subsequently, the Reb D clear solution was subjected to spray drying resulting in powder containing 22.2% Reb D.

Example 8

To a 1000 ml beaker, 3 g Reb D and 550 g water were added. The Reb D mixture was heated to 80-100° C. until completely dissolved. Then, 30 g maltodextrin, 24 g erythritol, and 12 g (25%) gum arabic were added. The temperature was maintained above 70° C. to keep Reb D clear solution. Subsequently, the Reb D clear solution was subjected to spray drying resulting in powder containing 5% Reb D.

Example 9

To a 1000 ml beaker, 3 g Reb D and 800 g water were added. The Reb D mixture was heated to 80-100° C. until completely dissolved. Then, 24 g (25%) gum arabic solution was added. The temperature was maintained above 70° C. to keep Reb D clear solution. Subsequently, the Reb D clear solution was subjected to spray drying resulting in powder containing 33.3% Reb D.

Example 10

To a 1000 ml beaker, 3 g Reb D and 516 g water were added. The Reb D mixture was heated to 80-100° C. until completely dissolved. Then, 60 g maltodextrin and 24 g (25%) gum arabic solution were added. The temperature was maintained above 70° C. to keep Reb D clear solution. Subsequently, the Reb D clear solution was subjected to spray drying resulting in powder containing 4.35% Reb D.

Example 11

To a 1000 ml beaker, 3 g Reb D and 580 g water were added. The Reb D mixture was heated to 80-100° C. until completely dissolved. Then, 45 g maltodextrin and 24 g (25%) gum arabic solution were added. The temperature was maintained above 70° C. to keep Reb D clear solution. Subsequently, the Reb D clear solution was subjected to spray drying resulting in powder containing 5.56% Reb D.

Example 12

To a 1000 ml beaker, 3 g Reb D and 580 g water were added. The Reb D mixture was heated to 80-100° C. until completely dissolved. Then, 30 g maltodextrin and 24 g (25%) gum arabic solution were added. The temperature was maintained above 70° C. to keep Reb D clear solution. Subsequently, the Reb D clear solution was subjected to spray drying resulting in powder containing 7.69% Reb D.

Example 13

To a 1000 ml beaker, 1.5 g Reb D and 500 g water were added. The Reb D mixture was heated to 80-100° C. until completely dissolved. Then, 30 g erythritol was added. The temperature was maintained above 70° C. to keep Reb D clear solution. Subsequently, the Reb D clear solution was subjected to spray drying resulting in powder containing 4.76% Reb D.

Example 14

To a 2000 ml beaker, 5 g Reb D and 995 g water were added. The Reb D mixture was heated to 80-100° C. until completely dissolved. Then, 5 g sucrose was added. The temperature was maintained above 70° C. to keep Reb D clear solution. Subsequently, the Reb D clear solution was subjected to spray drying resulting in powder containing 47.5% Reb D.

Example 15

To a 2000 ml beaker, 5 g Reb D and 995 g water were added. The Reb D mixture was heated to 80-100° C. until completely dissolved. Then, 2.5 g sucrose was added. The temperature was maintained above 70° C. to keep Reb D clear solution. Subsequently, the Reb D clear solution was subjected to spray drying resulting in powder containing 63.3% Reb D.

Example 16

To a 1000 ml beaker 5 g Reb D (95%) and 980 g water were added. The Reb D mixture was heated to 80-100° C. until completely dissolved. Then, 10 g glucose was added. The temperature was maintained above 70° C. to keep Reb D clear solution. Subsequently, the Reb D clear solution was subjected to spray drying resulting in powder containing 31.67% Reb D.

Example 17

To a 1000 ml beaker 5 g Reb D (95%) and 980 g water were added. The Reb D mixture was heated to 80-100° C. until completely dissolved. Then, 10 g potassium sorbate was added. The temperature was maintained above 70° C. to keep Reb D clear solution. Subsequently, the Reb D clear solution was subjected to spray drying resulting in powder containing 31.67% Reb D.

Example 18

To a 1000 ml beaker 5 g Reb D (95%) and 980 g water were added. The Reb D mixture was heated to 80-100° C. until completely dissolved. Then, 10 g sodium benzoate was added. The temperature was maintained above 70° C. to keep Reb D clear solution. Subsequently, the Reb D clear solution was subjected to spray drying resulting in powder containing 31.67% Reb D.

TABLE 1

Modified Reb D Solubility in Water

| Sample ID | Composition | Solubility (23° C.) (ppm) |
|---|---|---|
| Control | untreated Reb D | 350 |
| Example 1 | 95% Reb D | 1500 |
| Example 2 | 66.67 Reb D/33.3% Gum arabic | 2500 |
| Example 3 | 22.2% Reb D/66.7 Sucrose/11.1 Gum arabic | 6000 |
| Example 4 | 18.18% Reb D/54.5% Maltodextrin/18.18% Erythritol/9% Gum arabic | 5000 |
| Example 5 | 28.57% Reb D/28.57% Maltodextrin/28.57% Erythritol/14.25% Gum arabic | 7000 |
| Example 6 | 20% Reb D/40% Maltodextrin/20% Erythritol/20% Gum arabic | 4500 |
| Example 7 | 22.2% RebD/66.7% Maltodextrin/11.1 Gum arabic | 5000 |
| Example 8 | 5% Reb D/50% Maltodextrin/40% Erythritol/5% Gum arabic | 7000 |
| Example 9 | 33.3% Reb D/66.7% Gum arabic | 3000 |
| Example 10 | 4.35% RebD/86.9% Maltodextrin/8.7% Gum arabic | 3000 |
| Example 11 | 5.56% Reb D/83.3% Maltodextrin/11.1 Gum arabic | 2500 |
| Example 12 | 7.69% RebD/77% Maltodextrin/15.4% Gum arabic | 2500 |
| Example 14 | 47.5% Reb D/50% Sucrose | 3500 |
| Example 15 | 63.3% RebD/33.3% Sucrose | 2500 |
| Example 16 | 31.7% RebD/66.7% Glucose | 8000 |
| Example 17 | 31.7% Reb D/66.7% Potassium sorbate | 8000 |
| Example 18 | 31.7%% Reb D/66.7% Sodium Benzoate | 2200 |

As used in this disclosure, unless otherwise specified, the term "added" or "combined" and like terms means that the multiple ingredients or components referred to (e.g., one or more solubility enhancer, polysaccharide, etc.) are combined in any manner and in any order, with or without stirring or the like, etc. For example, one or more ingredients can be dissolved into one or more other ingredients, or sprayed together, etc. As used here, a slurry, may be a suspension, dispersion, or other form of flowable material.

While this disclosure mentions specific examples and embodiments, those skilled in the art will appreciate that there are numerous variations and modifications within the spirit and scope of the invention as set forth in the appended claims. Each word and phrase used in the claims is intended to include all its dictionary meanings consistent with its usage in this disclosure and/or with its technical and industry usage in any relevant technology area. Indefinite articles, such as "a," and "an" and the definite article "the" and other such words and phrases are used in the claims in the usual and traditional way in patents, to mean "at least one" or "one or more." The word "comprising" is used in the claims to have its traditional, open-ended meaning, that is, to mean that the product or process defined by the claim may optionally also have additional features, elements, etc. beyond those expressly recited in the claim.

What is claimed is:

1. A method of enhancing the solubility of Rebaudioside D ("Reb D") in aqueous-based liquids comprising:
   a. preparing a clear Reb D solution by adding Reb D powder to water and heating to completely dissolve the Reb D powder, or by extracting Reb D from stevia plant using hot/boiling water or water/ethanol, wherein the temperature of the clear Reb D solution is above 70° C.;
   b. mixing the clear Reb D solution with a solubilizing enhancer, wherein the temperature of the enhanced Reb D solution is maintained above 70° C., and wherein the solubilizing enhancer is a water soluble organic acid salt, a water soluble organic acid, or a hydroxyl-containing sweetener;
   c. adding a stabilizer to the enhanced Reb D solution to produce a stabilized Reb D solution; wherein the stabilizer comprises a thickener or anti-agglomeration agent; and
   d. spray drying the stabilized Reb D solution to form a powder.

2. The method according to claim 1 wherein the concentration of Reb D in the clear Reb D solution in step (a) 0.05 wt % to 2.5 wt %.

3. The method according to claim 1 adding Reb D powder to water at a temperature of above 70° C. or adding the Reb D powder to water and then heating to a temperature of above 70° C.

4. The method according to claim 1 wherein the temperature in step (a) is 80 to 100° C.

5. The method according to claim 1 wherein the ratio of the hydroxyl-containing sweetener to Reb D is from 0.01:1 to 100:1.

6. The method according to claim 1 wherein the ratio of hydroxyl-containing sweetener to Reb D is from 0.1:1 to 50:1.

7. The method according to claim 1 wherein the enhanced Reb D solution is maintained above 70° C. to maintain a clear solution.

8. The method according to claim 1 wherein the solubilizing enhancer is an acid salt or an organic acid selected from the group consisting of potassium sorbate, sodium benzoate, sodium citrate, sorbic acid, ascorbic acid, benzoic acid, citric acid, tartaric acid, propionic acid, butyric acid, succinic acid, glutaric acid, maleic acid, malic acid, valeric acid, caproic acid and amino acids.

9. The method according to claim 1 wherein the solubilizing enhancer is a hydroxyl-containing sweetener is selected from the group consisting of erythritol, sucrose, maltodextrin, glycerol, propylene glycol, glucose, fructose, maltose, dextrose, xylose, sorbitol, xyitol, mannitol, maltitol, lactiol, arabitol, isomalt, or mixtures of any of them.

10. The method according to claim 1 wherein the ratio of stabilizer to Reb D is from 0.01:1 to 5:1.

11. The method according to claim 1 wherein the stabilizer is selected from the group consisting of gum Arabic, pectin, carrageenan, ghatti gum, acacia gum, guar gum, xanthan gum, gellan gum, locust bean gum, agar, starch, alginate, cellulose, modified starch, carboxyl methyl cellulose (CMC) or mixtures of any of them.

12. The method of claim 8 wherein the organic acid salt or the organic acid is potassium sorbate, sodium benzoate, or ascorbic acid.

13. The method of claim 9 wherein the hydroxyl-containing sweetener is sucrose, maltodextrin, erythritol, or a combination thereof.

14. The method according to claim 1 wherein the stabilized solution is maintained above 70° C. to maintain a clear solution.

15. The method according to claim 1 wherein the spray dried powder has a particle size of 1 to 300 microns.

16. The method according to claim 1 wherein the spray dried powder has a solubility of up to 8000 ppm at 23° C.

17. The method of claim 1 wherein the stabilizer is gum arabic.

18. A beverage comprising the powder prepared in accordance with claim 1.

19. A beverage concentrate comprising the powder prepared in accordance with claim 1.

* * * * *